United States Patent
Jesus De Sequeira Serra Nunes

(10) Patent No.: US 9,656,917 B2
(45) Date of Patent: May 23, 2017

(54) WHITE OR COLORED CEMENTITIOUS MIXTURE FOR MANUFACTURE OF CONCRETE, MORTAR AND PASTES WITH THERMOCHROMATIC PROPERTIES

(71) Applicant: SECIL S.A.—COMPANHIA GERAL DE CAL E CIMENTO, Setubal (PT)

(72) Inventor: Angela Maria Jesus De Sequeira Serra Nunes, Vila Nogueira de Azeitao (PT)

(73) Assignee: SECIL, S.A.-, Setubal (PT)

( * ) Notice: Subject to any disclaimer, the term of this patent is extended or adjusted under 35 U.S.C. 154(b) by 165 days.

(21) Appl. No.: 14/437,239

(22) PCT Filed: Oct. 21, 2013

(86) PCT No.: PCT/PT2013/000058
§ 371 (c)(1),
(2) Date: Apr. 21, 2015

(87) PCT Pub. No.: WO2014/065682
PCT Pub. Date: May 1, 2014

(65) Prior Publication Data
US 2015/0274592 A1    Oct. 1, 2015

(30) Foreign Application Priority Data
Oct. 22, 2012    (PT) .................................. 106589

(51) Int. Cl.
| | |
|---|---|
| *C04B 14/10* | (2006.01) |
| *C04B 14/28* | (2006.01) |
| *C04B 20/00* | (2006.01) |
| *C04B 22/14* | (2006.01) |
| *C04B 24/08* | (2006.01) |
| *C04B 24/26* | (2006.01) |
| *C04B 28/04* | (2006.01) |
| *C04B 111/00* | (2006.01) |
| *C04B 111/80* | (2006.01) |
| *C04B 111/82* | (2006.01) |

(52) U.S. Cl.
CPC ..... *C04B 28/04* (2013.01); *C04B 2111/00482* (2013.01); *C04B 2111/80* (2013.01); *C04B 2111/82* (2013.01)

(58) Field of Classification Search
CPC ........... C04B 28/04; C04B 2111/00482; C04B 2111/80; C04B 2111/82; C04B 14/10; C04B 14/28; C04B 20/008; C04B 22/143; C04B 24/085; C04B 24/2623; C04B 2103/0068; C04B 2103/0088; C04B 2103/32; C04B 2103/54
USPC ........................................................ 524/5
See application file for complete search history.

(56) References Cited

FOREIGN PATENT DOCUMENTS

WO    WO 2011/057898    *    5/2011

OTHER PUBLICATIONS

Ma Y et al., "Research on the preparation of reversibly thermochromic cement based materials at normal temperature," Cement and Concrete Research, vol. 39, No. 2, Feb. 1, 2009, pp. 90-94.*

* cited by examiner

*Primary Examiner* — Angela C Scott
(74) *Attorney, Agent, or Firm* — Sughrue Mion, PLLC

(57) ABSTRACT

The present invention relates to a white or colored cementitious mixture for the manufacture of micro-concrete or normal concrete, mortar or pastes with thermochromatic properties, i.e., changing its color depending on the temperature at which the material is exposed. This color change is reversible after some time of exposure to another level of temperature. This cementitious mixture comprises the following components, in percentage in weight of the components relative to the total weight of the composition: a) 35-80% of white or gray Portland cement; b) 0.1-30% of finely ground limestone filler; c) 0.01-3% of powdered super-plasticizer; d) 0.01-3% of modified polyvinyl resins; e) 0.01-5% of dispersant of vinyl acetate and ethylene copolymers; f) 0.3-15% of encapsulated photochromic copolymers; and also one or more components selected from: g) 1-10% of binding regulator; h) 0.1-4% of zinc stearate; i) 1-20% of metakaolins; j) 5-60% of artificial pozzolans; k) 0.1-15% of inorganic pigments.

10 Claims, 1 Drawing Sheet
(1 of 1 Drawing Sheet(s) Filed in Color)

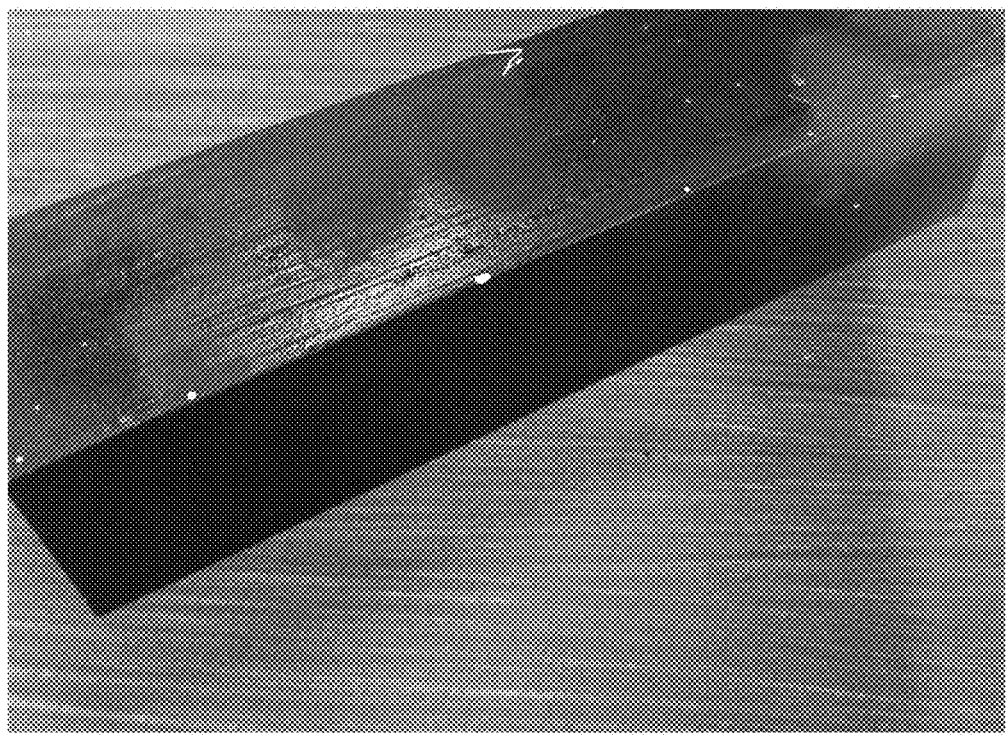

WHITE OR COLORED CEMENTITIOUS MIXTURE FOR MANUFACTURE OF CONCRETE, MORTAR AND PASTES WITH THERMOCHROMATIC PROPERTIES

CROSS REFERENCE TO RELATED APPLICATIONS

This application is a National Stage of International Application No. PCT/PT2013/000058 filed Oct. 21, 2013, claiming priority based on Portuguese Patent Application No. 106589 filed Oct. 22, 2012, the contents of all of which are incorporated herein by reference in their entirety.

FIELD OF THE INVENTION

The present invention falls in the field of new building materials, particularly in micro-concrete, concrete and mortar produced from preweighed thermochromatic cementitious mixtures, with preferential application in the fields of coating mortars, in the prefabrication, in in-situ concreted superstructures, in urban furniture and other decorative elements, exposed to thermal variations and that exhibit color alterations of its surface as consequence of that variations, reversing to other colorations due to a new change in the temperature range of exposure.

BACKGROUND OF THE INVENTION

The mortars are widely used nowadays in coating of buildings, as well as in the respective finishing pastes. On the other hand, also the concrete with high performance at architectural level is presently a widely used material in architecture and civil Engineering, allowing answering to many technical and aesthetic challenges required by current architectonic trends.

In addition to the architectural interest, the possibility of color change of concrete and mortar depending on the temperature to which it is exposed can also be of interest from the point of view of energy efficiency. Thus, a concrete/mortar that has dark hue when exposed to low temperature during the winter will maximize heat gains to which are exposed, benefiting the building thermally. Conversely, during the summer as consequence of increasing environment temperature the color may change to lighter hues until reaching the base white color, in order to allow a maximum reflectance of solar radiation and thus minimize the heat absorption during hot weather.

This preweighed cementitious mixture with predefined thermochromatic properties can be used in the manufacture of coating and finishing mortars, in finishing and painting pastes and also in precast and in-situ concretes, thus conferring the said properties to the material in its final shape.

Patent KR100890863 describes a thermochromatic concrete, i.e., a product obtained by the introduction of a thermochromatic pigment in a normal concrete, not mentioning any other applications besides concrete and presenting rather weak results of thermochromatic effect durability. On the other hand, it does not allow for a wide combination of colors and colorimetric variation ranges for different temperature stages.

Patent KR20100072530 refers to the use of thermochromatic pigments for insertion into concrete surface during its casting, by surface coating of the mold, which will hardly allow reaching a uniform surface color and also a homogeneous reaction to temperature, which is not feasible for applications in large areas according to the usual architectural requirements.

BRIEF DESCRIPTION OF THE FIGURE

The patent or application file contains at least one drawing executed in color. Copies of this patent or patent application publication with color drawings will be provided by the Office upon request and payment of the necessary fee.

FIG. 1 shows a mortar sample produced from the thermochromatic cementitious mixture ranging from purple to red at the 10° C. transition, layered on a concrete slab by application of thermochromatic paste coating using the same cementitious mixture (the lower temperature of the sample affect the plate thus changing its color).

SUMMARY OF THE INVENTION

This invention allows solving the technical problem consisting on having a preweighed cementitious mixture which can confer the ability of color changing to the concrete, mortar, pastes and paintings/limewash prepared with it, depending on the temperature ranges to which they are exposed. This color change is reversible and can be chosen in advance depending on the hue and ranges of sensitivity to the temperature to be achieved.

A technical solution has been found which allows, departing from the addition of thermochromatic pigments to the cement by combining a number of polymers, to stabilize the mixture and enable its dissolution in the cementitious medium, without changing the performance of the remaining features when acting and with acceptable durability considering the type of product (in most cases it is estimated more than 5 years). This fact allows the production of concrete, mortar, cementitious pastes/paintings that respond to thermal stimuli, keeping reversibly the other properties.

DETAILED DESCRIPTION OF THE INVENTION

The present invention relates to a stable cementitious mixture which allows the production of concrete, mortar and pastes with thermochromatic properties. This cementitious mixture allows the maintenance of the pigment thermochromatic properties, changing the color of the material as a function of the temperature ranges, even after hardening of said concrete, mortar or paste.

The combination of various pigments with different color changing points in a given mixture allows to obtain concrete, mortar and cementitious pastes whose color changes according to various levels of temperature, starting by showing, for instance, purple or black color at temperatures below 10° C., red color in the range between 10° C. and 30° C., and white color above 30° C. This effect may allow an improvement of the material thermal properties, contributing to the energy efficiency of buildings where it is used.

Among generic processes and general applications are included:

Execution of walls and floors, or other structural elements cast in situ or prefabricated in concrete;
Façades of buildings (large façade elements or prefabricated panels);
Viaduct superstructures and edge beams;
Road, pedestrian and aeronautical paving made of concrete, both urban and non-urban;

Urban furniture and other interior and exterior decorative elements;
Roofs and roofing materials;
Thin layer coatings of walls such as plasters and tinplating pastes;
Silicated paintings based on cement with possibility of color change due to thermosensitivity, for application to concrete, ceramics, and other compatible surfaces.

Compared to products of similar performance, those herein described stand out by the ability of changing color due to temperature changes.

White cements of high brightness and strength are used as binders, which are modified by polymers and copolymers in order to allow pigment dissolution and its effectiveness in the highly alkaline medium.

In addition, the desired effect was obtained by joining several high reactivity and fineness materials such as metakaolins, pozzolan of high activity, reactive calcium hydroxides, calcium sulfates of high fineness and other oxides such as zinc, which allow lowering the pH of the mixture and facilitate the compatibility and stability of the encapsulated polymer as well as its durability without substantial loss of reactivity from the binder.

On the other hand, the addition of a series of super-plasticizers based on polycarboxylate, melamine and other waterproofing effect materials such as stearates of calcium and zinc, as well as modified polyvinyl resins, also helps in the stability and effect of the copolymer pigment, due to an effective reduction of the mixing water and enabling to obtain a high compactness compatible with the desired mechanical performance.

OBJECT OF THE INVENTION

The object of the present invention is a cementitious mixture with thermochromatic properties, i.e., it changes color depending on the temperature range to which it is exposed, with an high fluidity, easy to apply, with an high reactive homogeneity, usable in the production of concrete, mortar, silicated pastes and paintings/cementitious lime-wash, comprising the following components, in percentage in weight of the components relative to the total weight of the composition:
  a) 35-80% of white or gray Portland cement;
  b) 0.1-30% of finely ground limestone filler;
  c) 0.01-3% of super-plasticizer;
  d) 0.01-3% of modified polyvinyl resins;
  e) 0.01-5% of dispersant of vinyl acetate and ethylene copolymers;
  f) 0.3-15% of encapsulated photochromatic copolymers of various colors and various thermal sensitivity ranges;
and also one or more components selected from:
  g) 1-10% of binding regulator;
  h) 0.1-4% of zinc stearate;
  i) 1-20% of metakaolins;
  j) 5-60% of artificial pozzolans;
  k) 0.1-15% of inorganic pigments.

The component b) typically has a particle size less than 90 microns.

Usually the component c) consists of sulfonated melamine condensates, or equivalent.

Preferably the component d) is present in a percentage by weight of 0.15-0.60%.

The component e) is generally present in a percentage by weight of 1-2%; component f) is usually present in a percentage by weight of 1-5% and can presents itself in various hues and different turning points of thermochromatism.

The binding regulator referred as component g) is preferably plaster in a percentage by weight of 2.2-5%.

The component h) is generally present in a percentage by weight of 0.25-0.65%; the component i) is present in a percentage by weight of 2-10%; and the component j), usually calcined clay, is present in a percentage by weight of 10-50%.

In the case of a colored substrate concrete, the component k) is present and it is generally constituted by metal oxide pigments.

Usually, the cementitious mixture according to the invention has a high mechanical strength to compression, depending on the cementitious mixture dosage used in the production of concrete and/or mortar, which shall never be less than about 380 kg/m$^3$ in order to ensure a correct finishing and the desired thermochromatism effect.

PREPARATION EXAMPLES

In the following, some examples of preparation and application according to the invention are presented. These examples are intended to better illustrate the invention without any limitation on the content thereof.

Example 1

Self-Compacting Micro-Concrete with High Architectural Performance and with Thermochromatism in the Range Below 10° C. and Above 30° C.

| | Component of the Cementitious Mixture | Weight % |
|---|---|---|
| 1 | White Portland cement | 50.0 |
| 2 | Finely ground limestone filler | 15.0 |
| 3 | Condensate of sulfonated melamine | 0.8 |
| 4 | Modified polyvinyl resin | 0.4 |
| 5 | Metakaolin | 26.6 |
| 6 | Dispersant of vinyl acetate and ethylene copolymers | 1.2 |
| 7 | Thermochromatic copolymer with thermochromatism sensitivity to 10° C., blue color | 2.5 |
| 8 | Thermochromatic copolymer with thermochromatism sensitivity to 30° C., red color | 2.5 |

Manufacturing Steps:

Place the components 1, 2, 3 and 4 in the mixer, and subsequently add component 5. Mix separately components 6, 7 and 8 and add to the previous mixture. Mix for at least 120 s. The cementitious mixture is ready to use. Add this mixture in 3 parts of silica sand and 1 part of cementitious mixture to fabricate the micro-concrete, adding water until the mixture is fluid and homogeneous, very easy to apply. Pour in directly into the mold of the piece to produce.

Example 2

Colored Cementitious Painting Thermosensitive in the Range of 30° C. and Below 10° C.

| | Component of the Cementitious Mixture | Weight % |
|---|---|---|
| 1 | White Portland cement | 62.4 |
| 2 | Finely ground limestone filler | 5.0 |
| 3 | Condensate of sulfonated melamine | 0.6 |
| 4 | Modified polyvinyl resin | 0.4 |
| 5 | Artificial white pozzolan | 17.0 |
| 6 | Dispersant of vinyl acetate and ethylene copolymers | 2.9 |

| | Component of the Cementitious Mixture | Weight % |
|---|---|---|
| 7 | Thermochromatic copolymer with thermochromatism sensitivity to 30° C., red color | 4.0 |
| 8 | Thermochromatic copolymer with thermochromatism sensitivity to 10° C., blue color | 4.0 |
| 9 | Binding regulator | 3.0 |
| 10 | Zinc stearate | 0.7 |

Manufacturing Steps:

Place components 1, 2, 3, 4 and 10 in the mixer, and subsequently add components 5, 6, 7, 8, 9 and mix for at least 120 s. Add an aqueous acrylic emulsion with a concentration of 30% to this cementitious mixture, in the proportion of 2 parts of emulsion to 1 part of cementitious mixture and dissolve well, preferably using a spiral mixer. Apply the limewash on the surface with the help of a paint roller in at least two coats and in the absence of rain, excessive humidity or temperatures below 5° C., in a clean surface.

The invention claimed is:

1. A cementitious mixture with thermochromatic properties usable in the production of concrete, mortar, pastes and silicated paintings/cementitious limewash, characterized in that it comprises the following components, in percentage in weight of the components relative to the total weight of the composition:
   a) 35-80% of white or gray Portland cement;
   b) 0.1-30% of finely ground limestone filler having a particle size less than 90 microns;
   c) 0.01-3% of super-plasticizer;
   d) 0.01-3% of modified polyvinyl resins;
   e) 0.01-5% of dispersant of vinyl acetate and ethylene copolymers;
   f) 0.3-15% of encapsulated thermochromatic copolymers; and also one or more components selected from:
   g) 1-10% of binding regulator;
   h) 0.1-4% of zinc stearate;
   i) 1-20% of metakaolins;
   j) 5-60% of artificial pozzolans;
   k) 0.1-15% of inorganic pigments.

2. The cementitious mixture according to claim 1, characterized in that the component c) is composed of sulfonated melamine condensates.

3. The cementitious s mixture according to claim 1, characterized in that the component d) is present in a percentage by weight of 0.15-0.60%.

4. The cementitious mixture according to claim 1, characterized in that the component e) is present in a percentage by weight of 1-2%.

5. The cementitious mixture according to claim 1, characterized in that the component f) is present in a percentage by weight of 1-5%.

6. The cementitious mixture according to claim 1, characterized in that the component g) is plaster and is present in a percentage by weight of 2.2-5%.

7. The cementitious mixture according to claim 1, characterized in that the component h) is present in a percentage by weight of 0.25-0.65%.

8. The cementitious mixture according to claim 1, characterized in that the component i) is present in a percentage by weight of 2-10%.

9. The cementitious mixture according to claim 1, characterized in that component j) is present in a percentage by weight of 10-50%.

10. The cementitious mixture according to claim 1, characterized in that the component k) is constituted by inorganic pigments based on metal oxides.

* * * * *